(12) United States Patent
Herman et al.

(10) Patent No.: US 8,961,096 B2
(45) Date of Patent: Feb. 24, 2015

(54) ROTATABLE BIN OR LIKE OBJECT

(75) Inventors: Alvin Herman, Saskatoon (CA); Erin Herman, Clavet (CA)

(73) Assignee: Halliburton Energy Services, Inc., Houston, TX (US)

(*) Notice: Subject to any disclaimer, the term of this patent is extended or adjusted under 35 U.S.C. 154(b) by 626 days.

(21) Appl. No.: 13/148,293

(22) PCT Filed: Feb. 9, 2010

(86) PCT No.: PCT/CA2010/000188
§ 371 (c)(1),
(2), (4) Date: Oct. 21, 2011

(87) PCT Pub. No.: WO2010/091508
PCT Pub. Date: Aug. 19, 2010

(65) Prior Publication Data
US 2012/0024738 A1 Feb. 2, 2012

(30) Foreign Application Priority Data
Feb. 10, 2009 (CA) .................................. 2653370

(51) Int. Cl.
*B60P 3/16* (2006.01)
*B60P 1/64* (2006.01)
(Continued)

(52) U.S. Cl.
CPC ............... *B60P 1/6463* (2013.01); *B65D 88/30* (2013.01); *B60P 3/16* (2013.01); *B60P 1/486* (2013.01); *Y10S 414/132* (2013.01)
USPC ........... 414/332; 414/483; 414/781; 414/919; 222/168

(58) Field of Classification Search
CPC .................................. B60P 3/16; B65D 88/30
USPC ................. 414/332, 919, 425, 483, 491, 781; 366/42, 62, 63; 104/45; 222/167, 168; 248/349.1
See application file for complete search history.

(56) References Cited

U.S. PATENT DOCUMENTS 2,606,676 A * 8/1952 Dempster ...................... 414/469
3,208,616 A * 9/1965 Haskins ........................ 414/332
(Continued)

FOREIGN PATENT DOCUMENTS

CA      1084958 A      9/1980
CA      2600216 A1     3/2009
(Continued)

OTHER PUBLICATIONS

Foreign communication from the priority application—International Search Report and Written Opinion, PCT/CA2010/000188, May 21, 2010, 8 pages.
(Continued)

*Primary Examiner* — James Keenan
(74) *Attorney, Agent, or Firm* — John W. Wustenberg; Baker Botts L.L.P.

(57) ABSTRACT

A transportable apparatus has a main body configured to be transported in a horizontal orientation, and then raised to a vertical orientation in a working position. A base is mounted on the bottom end of the main body such that the main body rests on the base in the working position, and such that the base is carried at a rear end of the main body when the main body is in a horizontal transport position supported on. The base is rotatable about a vertical base axis such that the main body can be rotated with respect to the base about the base axis. A frame and wheels can be pivotally attached to the main body to transport the main body and then be stored in a vertical orientation along a wall of the man body in the working position.

24 Claims, 5 Drawing Sheets

(51) Int. Cl.
  *B65D 88/30* (2006.01)
  *B60P 1/48* (2006.01)

(56) References Cited

U.S. PATENT DOCUMENTS

| | | | | |
|---|---|---|---|---|
| 3,440,734 | A | * | 4/1969 | Batterton et al. ............... 34/65 |
| 3,618,801 | A | * | 11/1971 | Blanchard ...................... 414/483 |
| 3,833,263 | A | | 9/1974 | Jackson |
| 3,938,673 | A | * | 2/1976 | Perry, Jr. ......................... 414/21 |
| 4,163,626 | A | | 8/1979 | Batterton et al. |
| 4,626,166 | A | * | 12/1986 | Jolly ............................... 414/812 |
| 4,798,510 | A | * | 1/1989 | Lazenby ......................... 414/607 |
| 4,812,100 | A | * | 3/1989 | Lonardi et al. ................. 414/199 |
| 4,855,960 | A | * | 8/1989 | Janssen et al. ................... 366/8 |
| 4,893,735 | A | * | 1/1990 | Lonardi ........................... 222/168 |
| 4,944,646 | A | * | 7/1990 | Edwards et al. ............... 414/332 |
| 4,951,260 | A | * | 8/1990 | Strehlow ......................... 366/45 |
| 6,206,476 | B1 | | 3/2001 | Welton |
| 7,214,028 | B2 | | 5/2007 | Boasso et al. |
| 7,850,413 | B2 | * | 12/2010 | Fontana ...................... 414/331.14 |
| 8,142,134 | B2 | * | 3/2012 | Lavoie et al. ................... 414/812 |

FOREIGN PATENT DOCUMENTS

| | | |
|---|---|---|
| CA | 2653370 A1 | 8/2010 |
| GB | 639027 | 6/1950 |
| WO | 2010091508 A1 | 8/2010 |

OTHER PUBLICATIONS

Foreign communication from the priority application—International Preliminary Report on Patentability, PCT/CA2010/000188, Aug. 16, 2011, 8 pages.

Foreign communication from a related counterpart application—Canadian Office Action, CA 2,653,370, Oct. 3, 2012, 3 pages.

* cited by examiner

ROTATABLE BIN OR LIKE OBJECT

CROSS-REFERENCE TO RELATED APPLICATIONS

This application is a filing under 35 U.S.C. 371 of International Application No. PCT/CA2010/000188 filed Feb. 9, 2010, entitled "Rotatable Bin or Like Object," claiming priority of Canadian Patent Application No. CA 2,653,370 filed Feb. 10, 2009, which applications are incorporated by reference herein in their entirety.

FIELD OF INVENTION

This invention is in the field of transporting and setting up large objects such as bins, tanks, machines, and the like, and in particular setting up such objects in a desired orientation at a work site.

BACKGROUND OF THE INVENTION

In many industries it is required to set up an array of equipment at a temporary work site, and then disassemble the installation, move it to another work site, and re-assemble it. For example, asphalt and concrete plants are often set up in locations where large quantities of material are required for road or building construction. Similarly, well drilling rigs, such as those drilling for oil and gas, are set up at a drilling location, then taken down and moved to a different drilling location.

These portable plants and rigs typically include various tanks, bins, silos, and the like for water, asphalt, sand, cement, and other materials such as might be required at any particular work site. These are transported to the work site, often in a lowered horizontal transport orientation, and then raised to a vertical working orientation at the work site. For example, bins containing dry material especially are often elongated vertically when in a working position to maximize the quantity of material stored above a hoppered bottom such that the dry material will flow out by gravity.

This vertical orientation also reduces the ground area, or footprint, occupied by the installation. For example, in well drilling installations it is necessary to have a number of different materials located in proximity to the well being drilled, and the vertical orientation of tanks and bins facilitates such proximity. In other installations it may also be desirable to minimize the area occupied.

Bins and tanks are typically carried by flat bed trucks or trailers to the work site. The trailer is maneuvered into position, and then the bin is raised from the horizontal transport position to a vertical working position resting on the ground, and the trailer is moved away from the site. A loader machine or crane can be used, or in some cases the trailer may include a tilt up deck or hoist to raise the object to the vertical, or near vertical position. Tipping and dumping vehicles are well known for a wide variety of purposes where the load carried is tilted upward from a substantially horizontal transport position.

At a work site such as an asphalt or concrete plant, oil or gas well, or the like it is generally required to orient the bin or tank so that the contents can be removed as required. Where the contents are liquid generally an outlet port with a valve is provided so that conduits can be connected to deliver the liquid where required. A pump may also be required to move the liquid to the desired location of use. Orienting the outlet port on the tank close to the use location can shorten or simplify the conduit configuration, but generally orientation of the outlet is not critical, since liquid material can readily be delivered through a conduit network. Where the location of the outlet port is more critical, extra ports can be provided to enable an operator to draw liquid out of the tank at multiple locations.

Where the contents are granular, such as sand, cement, or the like, orientation of the outlet port is more critical. Bins holding granular material typically have a hoppered bottom to direct the last granular material out through the outlet port when the bin is getting empty. Thus it is not generally possible to conveniently provide multiple outlet ports on a granular material bin, and the outlet port is thus in a fixed location. Granular material also cannot flow or be easily pumped through a conduit, and so it is commonly required to provide a conveyor to move the granular material from the outlet port to the use location. Such conveyors are typically fixed in length and do not have the flexibility of conduits such as hoses used for liquid material. Thus, orientation of a bin for granular material when it is raised to the working position is more problematic. In order to properly orient the bin the trailer carrying the bin must be maneuvered to get the desired orientation, often in a limited area obstructed by other tanks, bins, and equipment.

U.S. Pat. No. 4,163,626 to Batterton et al., for example, discloses an erection means for a transport trailer. A large object such as a bin is carried on a flatbed trailer in a horizontal orientation. The bin is pivotally attached to the rear end of the trailer, and actuators bear against the bin and trailer to pivot the bin up to the vertical position. The apparatus is configured such that when the bin is vertical the floor of the bin is on the ground. The bin can then be disconnected from the trailer and actuators, and the trailer is driven away.

U.S. Pat. No. 3,833,263 to Jackson discloses a tipper vehicle that carries a load in a lowered position, illustrated as somewhat up from horizontal, and then raises the load to a vertical orientation resting on the ground. The described embodiment is for carrying a load comprising a stack of straw bales and depositing the bales on the ground. Once the load is tipped up to the vertical position, the trailer is driven away and the rear end of the vehicle slides out from under the stack of bales.

SUMMARY OF THE INVENTION

It is an object of the present invention to provide a transportable main body such as a bin, silo, tank, machine, or like large object that overcomes problems in the prior art.

In a first embodiment, the present invention provides a transportable apparatus comprising a main body configured to be transported in a substantially horizontal orientation, and configured to be raised to a substantially vertical orientation in a working position. A base is mounted on the bottom end of the main body such that the main body rests on the base when in the working position, and such that the base is carried at a rear end of the main body when the main body is in a horizontally oriented transport position supported on wheels for movement along the ground. The base is rotatable about a substantially vertical base axis such that the main body can be rotated with respect to the base about the base axis when in the working position.

In a second embodiment, the present invention provides a method of transporting a container and orienting an outlet port on the container at a dispensing location. The method comprises rotatably mounting a base on a bottom end of the container; supporting the container and base on wheels in a substantially horizontally orientated transport position and transporting the container to a work site; raising the container to a substantially vertically orientated working position with the container resting on the base; rotating the container with respect to the base about a substantially vertical base axis to locate the outlet port at the dispensing location.

In a third embodiment the present invention provides a transportable apparatus comprising a main body configured to be transported in a substantially horizontal orientation, and configured to be raised to a substantially vertical orientation in a working position. A base is rotatably mounted on a bottom end of the main body such that the main body rests on the base and can be rotated with respect to the base about a substantially vertical base axis when in the working position. A frame is pivotally attached at a bottom end thereof to a lower portion of the main body about a substantially horizontal pivot axis located above a bottom end of the base, the frame oriented in an upright stored position substantially aligned with a first side of the main body when the main body is in the working position. An actuator is operative to pivot the frame from the stored position downward about the pivot axis to a lowered transport position where the frame extends substantially horizontally away from the main body and wherein wheels rotatably attached to the frame support the frame for movement along the ground. A hitch at a top end of the frame is adapted for connection to a tow vehicle when the frame is in the transport position. When the frame is connected to a tow vehicle, the actuator can be operated to pivot the main body downward about the pivot axis to a lowered transport position where the first side of the main body rests on the frame and the base is above the ground, and the actuator can be operated to pivot the main body upward about the pivot axis to the working position.

The main body is typically a large object such as a bin, tank, silo, or could be a machine or other equipment. The rotatable base adds considerable versatility by allowing a main body to be quickly rotated to a desired orientation for more efficient or effective set up and operation. The apparatus further provides a conveniently portable main body and attached wheel supported frame that can be transported to a desired location by an ordinary towing vehicle and then setup in a vertical orientation in a relatively compact horizontal space.

BRIEF DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE INVENTION

Figure 1:
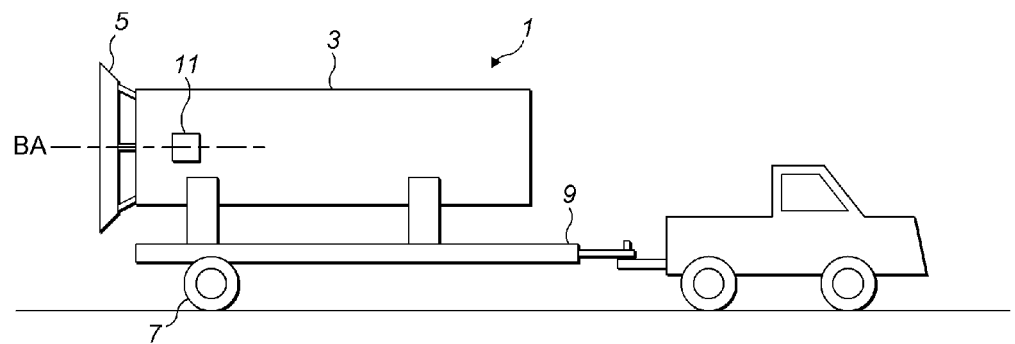
FIG. 1 is a schematic side view of an embodiment of an apparatus of the present invention supported on a trailer in a horizontal transport position.
Figure 2:
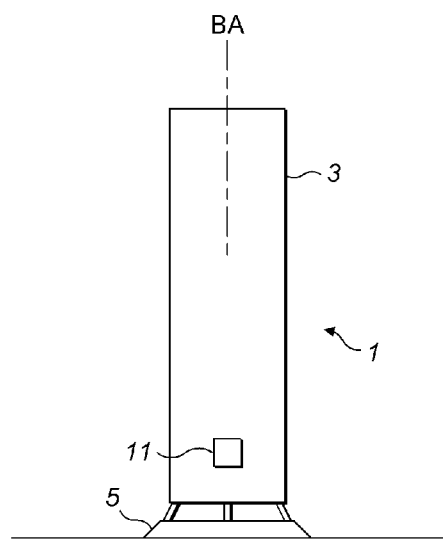
FIG. 2 is a schematic side view of the embodiment of FIG. 1 in a vertical working position.

FIGS. 1-5 schematically illustrate an embodiment of a transportable apparatus 1 of the present invention. The apparatus 1 comprises a main body illustrated as a bin 3 such as is used at work sites to store granular material such as sand, cement, or the like that is to be used at the site. The bin 3 is configured to be transported empty in a substantially horizontal orientation in a transport position as illustrated in FIG. 1, and configured to be raised to a substantially vertical orientation in a working position as illustrated in FIG. 2, and then filled with the granular material. FIG. 1 illustrates a typical application where the bin 3 is supported by a trailer 9 mounted on the wheels 7 in the transport position. It is contemplated as well that in some applications wheels could be attached directly to the bin 3.

A base 5 is mounted on the bottom end of the bin 3 such that the bin 3 rests on the base 5 when in the working position of FIG. 2. The base 5 is mounted to the bin 3 such that the base 5 is carried at a rear end of the bin 3 when the bin 3 is in a horizontally oriented transport position supported on wheels as illustrated in FIG. 1. The base 5 is rotatable about a substantially vertical base axis BA such that the bin 3 can be rotated with respect to the base 5 about the base axis BA when in the working position of FIG. 2. In the transport position of FIG. 1, the base axis BA is substantially horizontal.

Figure 3:
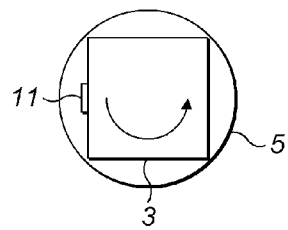
FIGS. 3-5 are schematic top views of the embodiment of FIG. 1 with the bin rotated to locate the outlet port at various locations.

The apparatus 1 is well suited to an application where the main body is a container, such as the illustrated bin 3, or a silo or tank for storing liquid or granular material at a work site. Such containers are commonly vertically oriented when working, and then for transport the container is emptied and laid down in a horizontal orientation to allow travel on roads. The illustrated bin 3 has an outlet port 11 in a lower portion of a sidewall on one side of the bin through which the stored granular material is withdrawn. Once the bin 3 has been raised to the vertical working position of FIG. 2, the bin 3 can be rotated about the base axis BA to move the outlet port 11 to a desired location as shown in FIGS. 3-5 where a conveyor or the like can receive granular material from the outlet port and direct the material to a location where it is needed.

Figure 4:
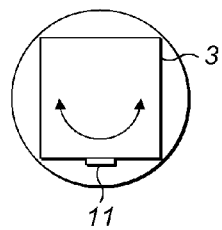
Figure 5:
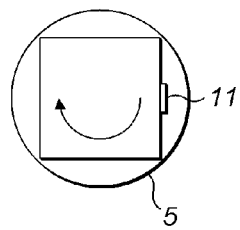

The bin 3 is oriented with the outlet port 11 located on the side of the horizontally oriented bin 3 in FIG. 1, and when raised to the vertical position of FIG. 2 the outlet port is located in the position of FIG. 4. From this initial position, the bin can be rotated as indicated by the arrows 90 degrees in each direction with respect to the base 5, as shown in FIGS. 3 and 5. It is contemplated that in many applications 180 degrees of rotation will be satisfactory, and more economical to build than a base that provides a full 360 degrees of rotation.

While the main body is illustrated as a bin 3, it is also contemplated that the main body could be a large machine or other apparatus that is transported horizontally and that is raised to vertical orientation when working.

Figure 6:
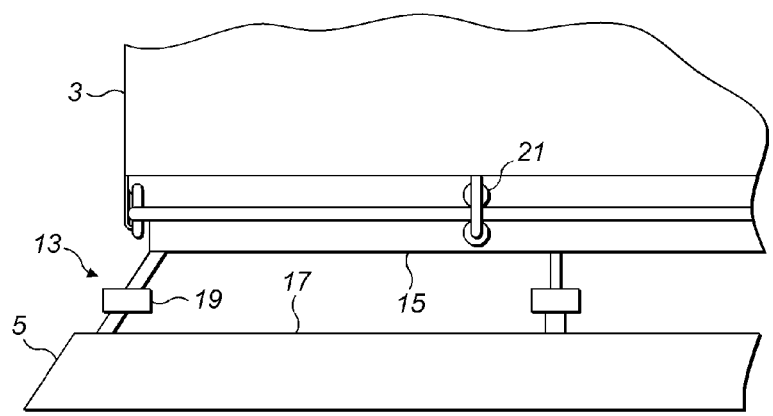
FIG. 6 is a schematic side view of the rotatable mounting of the base of the embodiment of FIG. 1 to the bin, including a weight sensing mechanism.

In the illustrated apparatus 1, the base 5 is mounted to the bin 3 by a weight sensing mechanism 13 that is schematically illustrated in FIG. 6. The weight sensing mechanism 13 is conveniently provided by a plurality of load cells and determines the weight of the bin 3 to determine a weight of contents of the bin 3. In the illustrated apparatus 1, the base 5 comprises a circular rail 15 mounted to a bottom portion 17 of the base 5 by a plurality of load cells 19. Roller assemblies 21 extend from the bottom end of the bin 3 and engage the rail 15.

Figure 7:
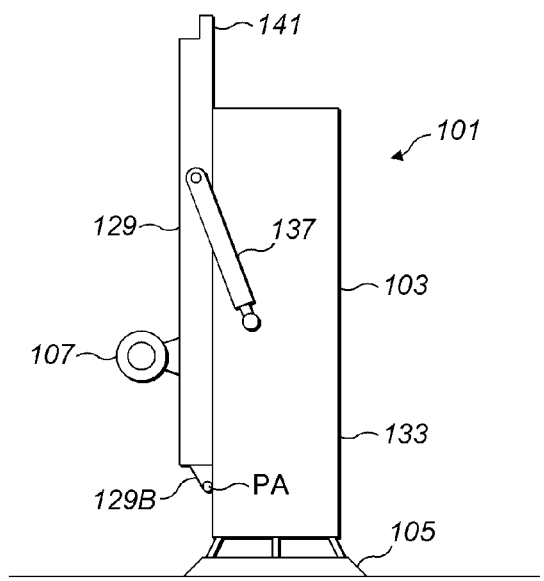
FIG. 7 is a schematic side view of an alternate embodiment of the present invention, including a frame and wheels pivotally attached to the main body, in the vertical working position.
Figure 8:
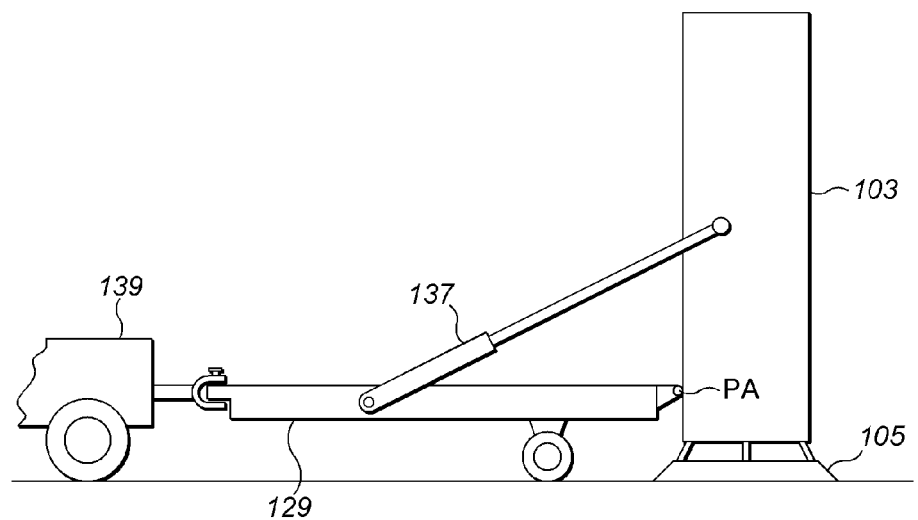
FIG. 8 is a schematic side view of the embodiment of FIG. 7 with the frame in a lowered transport position.
Figure 9:
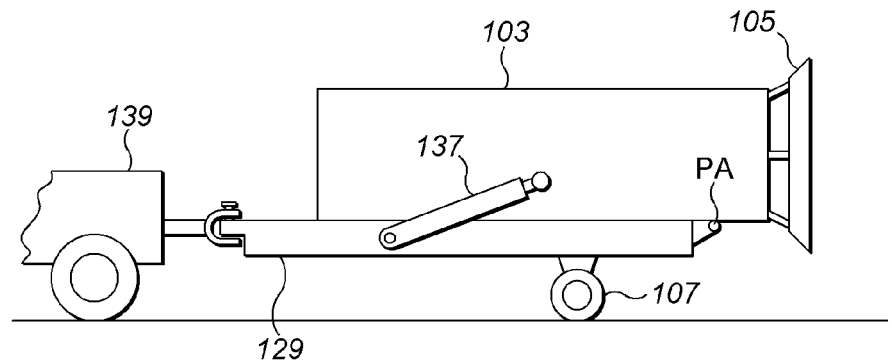
FIG. 9 is a schematic side view of the embodiment of FIG. 7 with the frame and main body in a lowered transport position.

FIGS. 7-9 schematically illustrate side views of an alternate embodiment of the transportable apparatus 101 of the present invention. The apparatus 101 comprises a main body, illustrated as a bin 103 oriented in its usual working position with a bottom end supported on a rotatably mounted base 105 resting ground surface and sides 133 extending upward from the bottom end of the bin 103.

A frame 129 is pivotally attached at a bottom end 129B thereof to a lower portion of the main body 103 about a substantially horizontal pivot axis PA located above the base 105. The frame 129 is shown in FIG. 7 in a stored position substantially aligned with a first side of the bin 103.

The apparatus 101 as illustrated in FIG. 7, with the bin 103 in the working position and the frame 129 in the stored position, is located at a work site. A plurality of such apparatuses 101, is illustrated at a work site in the schematic top view of FIG. 10. It can be seen that the bins 103 can be positioned in close proximity to each other to facilitate whatever activity is taking place at a work location 135. It is contemplated that the work location 135 could be an oil well drilling operation, concrete plant, or the like. The apparatus 101 of the present invention is well suited to activities of a temporary nature, where the bin 103 will be used for a period of time, and then must be transported to a different work location where another activity will be conducted.

When the activity is completed, it will be necessary to transport the apparatus 101 to another desired location. This is readily accomplished by operating an actuator 137 to pivot the frame 129 from the stored position of FIG. 7 downward about the pivot axis PA to a lowered transport position as illustrated in FIG. 8 where the frame 129 extends substantially horizontally away from the bin 103. The frame 129 is supported on wheels 107 for movement along the ground.

The apparatus 101 is configured such that the bin 3 is maintained in the upright working position when the actuator 137 is operated to move the frame 129 downward to the transport position. The bin typically will have a weight sufficient to resist the torque forces exerted by the weight of the frame 129 as it moves away from the bin 103. Alternatively, or in addition, the base 105 may be anchored to the ground by anchor stakes 134-securing the side of the base 105 opposite the frame 129 to the ground. Weights or other anchoring means could be used as well to ensure the bin 103 does not topple over as the frame 129 moves away and down toward the transport position.

Once the frame 129 is lowered to the transport position of FIG. 8 a tow vehicle 139 is attached to a hitch 141 at the top end of the frame 129. The actuator 137 is then operated to pivot the bin 103 downward about the pivot axis PA to a lowered transport position where the first side of the bin 103 rests on the frame 129 and the base 105 is above the ground. As the actuator 137 is operated to draw down the bin 103, the hitch 141 exerts an upward force on the tow vehicle 139, and the weight of the tow vehicle prevents the frame 129 from moving upward, such that the bin 103 is instead drawn down to rest on the frame 129. The apparatus 101 is then in a transport position where the tow vehicle 139 can tow the apparatus 101 to a desired location.

The illustrated actuator 137 is provided by an extendable cylinder, or a pair of cylinders, which typically will be a hydraulic or compressed air cylinder, pivotally attached at one end to the bin 103 and pivotally attached at an opposite end to the frame 129. In the illustrated apparatus 101, the cylinder 137 is extended to pivot the frame 129 downward to the lowered transport position of FIG. 9, and is then retracted to pivot the bin 103 downward to the lowered transport position resting on the frame. Fluid conduits connect the cylinder 137 to a source of pressurized fluid and controls for extending and retracting the cylinder 137. The pressurized fluid source will commonly be provided on the towing vehicle 139, and the fluid conduits are connected when required. It is contemplated that other actuators and configurations could be used as are known in the art.

In the illustrated apparatus 101, the pivot axis PA and the rotational axes of the wheels 107 are oriented substantially parallel to each other such that the bin 103 pivots downward in alignment with the travel direction. It can be seen that the apparatus 101 is configured such that the pivot axis PA is located on the bin 103 at a distance from the bottom of the base 105 such that the wheels 107 rest on the ground when the frame 129 is in the transport position of FIG. 8. This positioning is not exact, and those skilled in the art will recognize that the apparatus 101 can operate with reasonable variations in the relative positions of the wheels 107 and bin 103.

When the apparatus 101 has been towed to the next work location the operator will maneuver the frame 129 such that the base 105 is adjacent to a desired main body location in the transport position of FIG. 9. The cylinder 137 is then extended to pivot the bin 103 up to the working position of FIG. 8. The tow vehicle 139 is then disconnected and, if required the base 105 is anchored in the working position. The cylinder 137 is then retracted to draw the frame 129 up to the stored position of FIG. 7. Locks will typically be provided to secure the frame 129 in the stored position.

Figure 10:
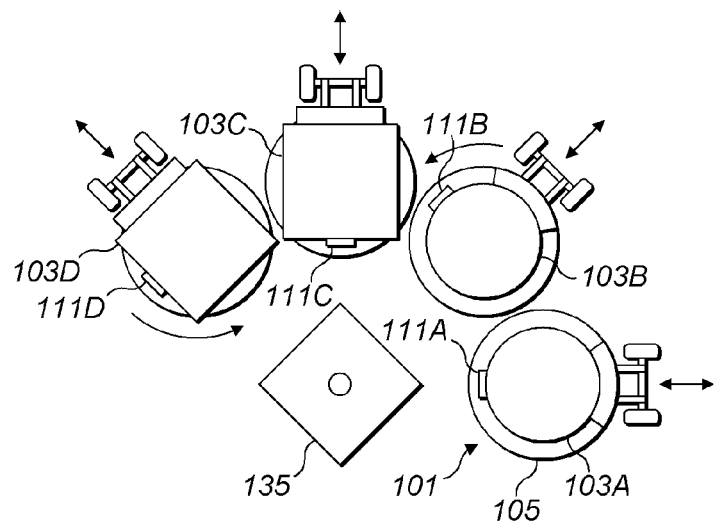
FIG. 10 is a schematic top view showing an array of apparatuses of FIG. 7 in proximity to a work location where access is available from numerous directions.
Figure 11:
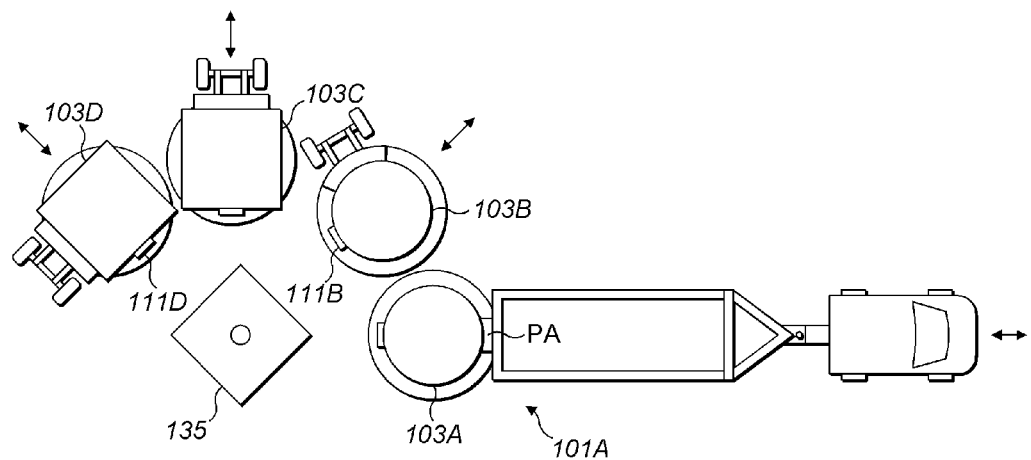
FIG. 11 is a schematic top view showing the array of FIG. 10 with the frame of one apparatus in the lowered transport position.
Figure 12:
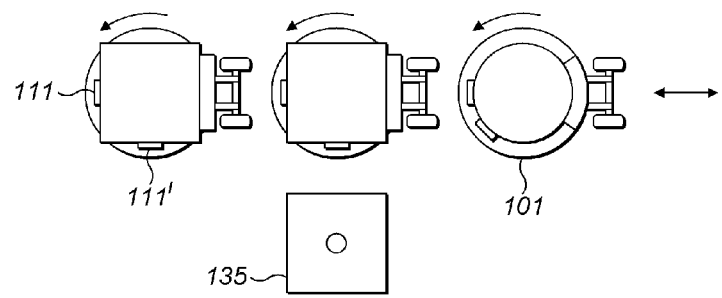
FIG. 12 is a schematic top view showing an alternate array of apparatuses of FIG. 7 in proximity to a work location where access is only available from a single direction.

Thus, a plurality of apparatuses 101 can be positioned around a work location 135 as illustrated in FIG. 10 where there is access to the location from all sides. FIG. 11 illustrates an apparatus 101A where the frame 129 is in the transport position and a tow vehicle 39 is connected to the hitch 141. A tow vehicle can move the apparatuses 101 into position and remove same along the arrows shown. FIG. 12 illustrates an alternate arrangement where access to the work location 135 is only available in a single direction indicated by the arrows, requiring that the apparatuses 101 be installed and removed in order.

FIG. 10 shows bins 103A, 103B, 103C, and 103D that have been moved into position along the straight arrows. It can be seen that the outlet ports 111A and 111C of the bins 103A, 103C are located facing the work location 135, but the outlet ports 111B and 111D of the bins 103B, 103D are located facing generally away from the work location 135. The bins 103B, 103D can then be rotated about their bases 105 as indicated by the curved arrows in FIG. 10 to position the outlet ports 111B and 111D such that same are also facing the work location 135. The bins 103A, 103C can be left in their original positions, or rotated to any other desired position. Thus, where space is limited at a work site, the apparatus 101 of the present invention allows for considerable flexibility in setting up the bins 103 with their corresponding outlet ports at a convenient location for a given situation.

Similarly in the arrangement of FIG. 12 where access to the work location 135 is only available in a single direction indicated by the straight arrow, the apparatuses 101 can be rotated as needed to move the outlet ports 111 from their original locations 111 to more convenient locations 111' if desired.

The apparatus 1 can be loaded on the trailer keeping in mind the final desired orientation of the outlet port 11, and the type of crane or other mechanism that will be used to move the containers 3 to the vertical working position, however it is not always known what the final arrangement will be. In the apparatus 101, the frame 129 is substantially fixed with respect to the outlet port 111, especially in hopper bins for granular material where a plurality of outlet ports is not possible. Thus, the rotatable base adds considerable versatility to the apparatus 101, allowing a single apparatus 101 to be quickly oriented with the outlet port in a convenient location.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

The invention claimed is:

1. A transportable container apparatus comprising:
    a main body, wherein the main body comprises a container;
    a base mounted on the bottom end of the main body; and
    a frame, wherein a lower end of the frame is pivotally attached to a lower portion of the main body about a substantially horizontal pivot axis, wherein the main body is pivotable with respect to the frame about the substantially horizontal pivot axis to transition the apparatus between a transport configuration and a working configuration,
        wherein, in the transport configuration, the main body is in a substantially horizontal orientation, the frame is supported by wheels in a substantially horizontal orientation, and the base is carried at a rear end of the main body, and
        wherein, in the working configuration, the main body is in a substantially vertical orientation, the frame is in a substantially vertical orientation and is not supported by the wheels, the main body and frame are supported by the base, and the main body and the frame are rotatable about a substantially vertical base axis such that the main body and the frame can be rotated with respect to the base about the base axis.

2. The apparatus of claim 1 wherein the main body comprises an outlet port defined in a lower portion of a sidewall of the container, and wherein the container can be rotated about the base axis to move the outlet port to a desired location.

3. The apparatus of claim 2 wherein the base is mounted to the container by a weight sensing mechanism such that a weight of contents of the container can be determined.

4. The apparatus of claim 3 wherein the weight sensing mechanism comprises a plurality of load cells.

5. The apparatus of claim 4 wherein the base comprises a circular rail mounted to a bottom portion of the base by the plurality of load cells, and wherein the main body comprises a plurality of roller assemblies extending from the bottom end of the main body and engaging the rail.

6. The apparatus of claim 1 wherein the frame comprises wheels.

7. The apparatus of claim 1 wherein the main body and frame can be rotated at least 180 degrees with respect to the base.

8. The apparatus of claim 1 further comprising:
    an actuator, wherein the actuator is operative to pivot the main body with respect to the frame about the pivot axis; and
    a hitch at an upper end of the frame, wherein the hitch is adapted for connection to a tow vehicle, wherein, when the frame is connected to a tow vehicle, the actuator can be operated to pivot the main body about the pivot axis between the substantially horizontal orientation and the substantially vertical orientation and wherein, when the frame is not connected to a tow vehicle, the actuator can be operated to pivot the frame about the pivot axis between the substantially horizontal orientation and the substantially vertical orientation.

9. The apparatus of claim 8 wherein the main body has a weight sufficient to maintain the main body in the working configuration when the actuator is operated to pivot the frame about the pivot axis when the frame is not connected to a tow vehicle.

10. The apparatus of claim 8 wherein the main body is configured to be anchored in the working configuration to maintain the main body in the vertical orientation when the actuator is operated to move the frame about the pivot axis.

11. The apparatus of claim 8 wherein the actuator comprises at least one extendable cylinder pivotally attached at a first end to the main body and pivotally attached at an opposite second end to the frame.

12. The apparatus of claim 11 wherein the cylinder is extended to pivot the frame away from the main body about the pivot axis to the horizontal orientation, and the cylinder is retracted to pivot the main body toward the frame about the pivot axis to the transport configuration.

13. The apparatus of claim 1 wherein the main body comprises one of a tank, a bin, and a silo.

14. A method of transporting and orienting a transportable container apparatus comprising a main body that comprises a container, a frame, a base, and an outlet port at a work site, the method comprising:
    transporting the transportable container apparatus to a work site in a transport configuration, wherein, in the transport configuration, the main body is in a substantially horizontal orientation and the frame is supported by wheels in a substantially horizontal orientation;
    transitioning the transportable container apparatus from the transport configuration to a working configuration, wherein, in the working configuration, the main body is in a substantially vertical orientation and the frame is in a substantially vertical orientation and is not supported by the wheels, and wherein transitioning the transportable container apparatus from the transport configuration to the working configuration comprises:
        pivoting the main body with respect to the frame about a substantially horizontal pivot axis such that the main body arrives in a substantially vertical orientation; and
        pivoting the frame with respect to the main body about the pivot axis such that the frame arrives in a substantially vertical orientation and such that the main body and frame rest on the base; and
    rotating the main body and frame with respect to the base about a substantially vertical base axis to locate the outlet port.

15. The method of claim 14, further comprising determining a weight of contents of the container via a weight sensing mechanism.

16. The method of claim 15 wherein the weight sensing mechanism comprises a plurality of load cells mounted between the container and a bottom of the base.

17. The method of claim 14,
    wherein transporting the transportable container apparatus comprises:
        connecting the transportable container apparatus to a tow vehicle via a hitch coupled to the frame; and
        towing the transportable container apparatus to the work site on wheels attached to the frame via the tow vehicle and maneuvering the transportable container apparatus to locate the base at a desired location,
    wherein transitioning the transportable container apparatus from the transport configuration to the working configuration comprises:
        operating an actuator to pivot the container upward about the pivot axis to the substantially vertical orientation with the container resting on the base;
        disconnecting the tow vehicle; and operating the actuator to pivot the frame upward about the pivot axis to the substantially vertically orientation such that the frame is aligned with a first side of the container.

18. The method of claim 17, wherein the main body and base have a weight sufficient to maintain the main body in the substantially vertical orientation when the actuator is operated to move the frame about the pivot axis.

19. The method of claim 17, further comprising anchoring the base, the main body, or both so as to maintain the main body in the substantially vertical orientation when the actuator is operated to move the frame about the pivot axis.

20. The method of claim 17 wherein the actuator comprises at least one extendable cylinder pivotally attached at a first end to the main body and pivotally attached at an opposite second end to the frame.

21. The method of claim 14, further comprising:
transitioning the transportable container apparatus from the working configuration to the transport configuration, wherein transitioning the transportable container apparatus from the working configuration to the transport configuration comprises:
pivoting the frame with respect to the main body about the pivot axis such that the frame arrives in the substantially horizontal orientation and such that the frame is supported by wheels; and
pivoting the main body with respect to the frame about the pivot axis such that the base is carried at the rear end of the main body; and
transporting the transportable container apparatus from the work site to a second work site in the transport configuration.

22. A transportable container apparatus comprising:
a main body, wherein the main body comprises a container;
a base mounted on the bottom end of the main body;
a frame, wherein a lower end of the frame is pivotally attached to a lower portion of the main body about a substantially horizontal pivot axis, wherein the main body is pivotable with respect to the frame about the substantially horizontal pivot axis to transition the apparatus between a transport configuration and a working configuration,
wherein, in the transport configuration, the main body is in a substantially horizontal orientation, the frame is supported by wheels in a substantially horizontal orientation, and the base is carried at a rear end of the main body, and
wherein, in the working configuration, the main body is in a substantially vertical orientation, the frame is in a substantially vertical orientation and is not supported by the wheels, the main body and frame are supported by the base, and the main body and the frame are rotatable about a substantially vertical base axis such that the main body and the frame can be rotated with respect to the base about the base axis;
an actuator, wherein the actuator is operative to pivot the main body with respect to the frame about the pivot axis; and
a hitch at an upper end of the frame, wherein the hitch is adapted for connection to a tow vehicle, wherein, when the frame is connected to a tow vehicle, the actuator can be operated to pivot the main body about the pivot axis between the substantially horizontal orientation and the substantially vertical orientation and wherein, when the frame is not connected to a tow vehicle, the actuator can be operated to pivot the frame about the pivot axis between the substantially horizontal orientation and the substantially vertical orientation.

23. The apparatus of claim 22 wherein the main body comprises an outlet port defined in a lower portion of a sidewall of the container, and wherein the container can be rotated about the base axis to move the outlet port to a desired location.

24. The apparatus of claim 22 wherein the base is mounted to the container by a weight sensing mechanism such that a weight of contents of the container can be determined.

* * * * *